(12) United States Patent
Falkowski et al.

(10) Patent No.: US 9,708,950 B2
(45) Date of Patent: Jul. 18, 2017

(54) GENSET ENGINE USING ELECTRICAL SENSING TO CONTROL COMPONENTS FOR OPTIMIZED PERFORMANCE

(71) Applicant: Cummins Power Generation IP, Inc., Minneapolis, MN (US)

(72) Inventors: David T. Falkowski, Blaine, MN (US); Luke R. Staples, New Hope, MN (US); Ryan A. Becker, Woodbury, MN (US); Nick V. Halstead, Oak Grove, MN (US); Andrew C. Walseth, Mounds View, MN (US); Daniel D. Wilhelm, Sanibel, FL (US)

(73) Assignee: CUMMINS POWER GENERATION IP, INC., Minneapolis, MN (US)

( * ) Notice: Subject to any disclaimer, the term of this patent is extended or adjusted under 35 U.S.C. 154(b) by 96 days.

(21) Appl. No.: 14/632,841

(22) Filed: Feb. 26, 2015

(65) Prior Publication Data

US 2016/0254768 A1    Sep. 1, 2016

(51) Int. Cl.
*F01D 15/10*  (2006.01)
*F02C 6/00*  (2006.01)
(Continued)

(52) U.S. Cl.
CPC .......... *F01N 3/2066* (2013.01); *F02D 21/08* (2013.01); *F02D 29/06* (2013.01);
(Continued)

(58) Field of Classification Search
CPC ..... H02P 9/008; H02P 2101/25; F01N 3/2066
(Continued)

(56) References Cited

U.S. PATENT DOCUMENTS 6,459,166 B2 * 10/2002 Yanase ................... B60K 6/46
                                                          123/179.28
7,007,460 B2 *  3/2006 Frieden ................ F01N 3/2006
                                                          60/274

(Continued)

OTHER PUBLICATIONS

Frank Willems and Darren Foster, Integrated Powertrain Control to meet future CO2 and Euro-6 emissions targets for a diesel hybrid with SCR-deNOx system, 2009 American Control Conference Hyatt Regency Riverfront, St. Louis, MO, USA, dated Jun. 10-12, 2009.

*Primary Examiner* — Pedro J Cuevas
(74) *Attorney, Agent, or Firm* — Foley & Lardner LLP

(57) ABSTRACT

A genset comprises an engine; an alternator, an exhaust system, a controller, and at least one of an intake system, an EVAP system, a fuel injector, an EGR system, a SAI system and an aftertreatment system. The controller is configured to control at least a portion of the genset. The controller is in electrical communication with one or more of the alternator, the EVAP system, the EGR system, the SAI system and the aftertreatment system via communication circuitry. Furthermore, the controller is configured to: (a) receive an electrical output from the alternator via the communication circuitry, (b) determine a load on the alternator from the electrical output, which corresponds to mechanical load on the engine, and (c) generate an electrical signal configured to at least partially control operation of at least one of the EVAP system, the EGR system, the SAI system and the aftertreatment system via the communication circuitry.

31 Claims, 3 Drawing Sheets

(51) Int. Cl.
*H02K 7/18* (2006.01)
*H02P 9/04* (2006.01)
*F01N 3/20* (2006.01)
*F02D 41/02* (2006.01)
*F02D 41/00* (2006.01)
*F02D 21/08* (2006.01)
*F02D 29/06* (2006.01)
*F02D 41/04* (2006.01)
*F02M 25/08* (2006.01)
*F02M 26/00* (2016.01)

(52) U.S. Cl.
CPC ....... *F02D 41/0002* (2013.01); *F02D 41/005* (2013.01); *F02D 41/0032* (2013.01); *F02D 41/021* (2013.01); *F02D 41/045* (2013.01); *F02M 25/08* (2013.01); *F02M 2026/001* (2016.02)

(58) Field of Classification Search
USPC .......................................................... 290/52
See application file for complete search history.

(56) References Cited

U.S. PATENT DOCUMENTS

| | | | |
|---|---|---|---|
| 7,291,935 B2 | 11/2007 | Yamashita et al. | |
| 9,550,413 B2* | 1/2017 | Take | F02D 41/0205 |
| 2001/0013702 A1* | 8/2001 | Yanase | B60K 6/46 |
| | | | 290/40 C |
| 2002/0050135 A1* | 5/2002 | Manaka | F01N 3/0842 |
| | | | 60/277 |
| 2005/0034449 A1* | 2/2005 | Frieden | F01N 3/2006 |
| | | | 60/284 |
| 2005/0173985 A1* | 8/2005 | Eguchi | H02J 7/1415 |
| | | | 307/10.1 |
| 2006/0163879 A1* | 7/2006 | Sekita | F02D 29/06 |
| | | | 290/41 |
| 2006/0273591 A1* | 12/2006 | Yamashita | F02D 29/06 |
| | | | 290/40 C |
| 2007/0044760 A1* | 3/2007 | Biruduganti | F02B 43/00 |
| | | | 123/406.45 |
| 2008/0121218 A1* | 5/2008 | Algrain | F02B 37/013 |
| | | | 123/565 |
| 2010/0106389 A1* | 4/2010 | Fore | F02D 29/06 |
| | | | 701/102 |
| 2011/0077817 A1* | 3/2011 | Sun | G07C 5/0808 |
| | | | 701/29.2 |
| 2011/0179779 A1* | 7/2011 | Falkowski | F01N 3/22 |
| | | | 60/299 |
| 2011/0289930 A1* | 12/2011 | Draper | F02C 3/34 |
| | | | 60/772 |
| 2012/0198794 A1* | 8/2012 | Turpin | F01N 3/046 |
| | | | 53/452 |
| 2012/0316754 A1* | 12/2012 | Narayanaswamy | F02D 41/024 |
| | | | 701/103 |
| 2014/0102187 A1 | 4/2014 | Andreae | |
| 2014/0123672 A1* | 5/2014 | Huntington | F02C 7/22 |
| | | | 60/777 |
| 2015/0204239 A1* | 7/2015 | Minto | F02C 3/34 |
| | | | 60/772 |

* cited by examiner

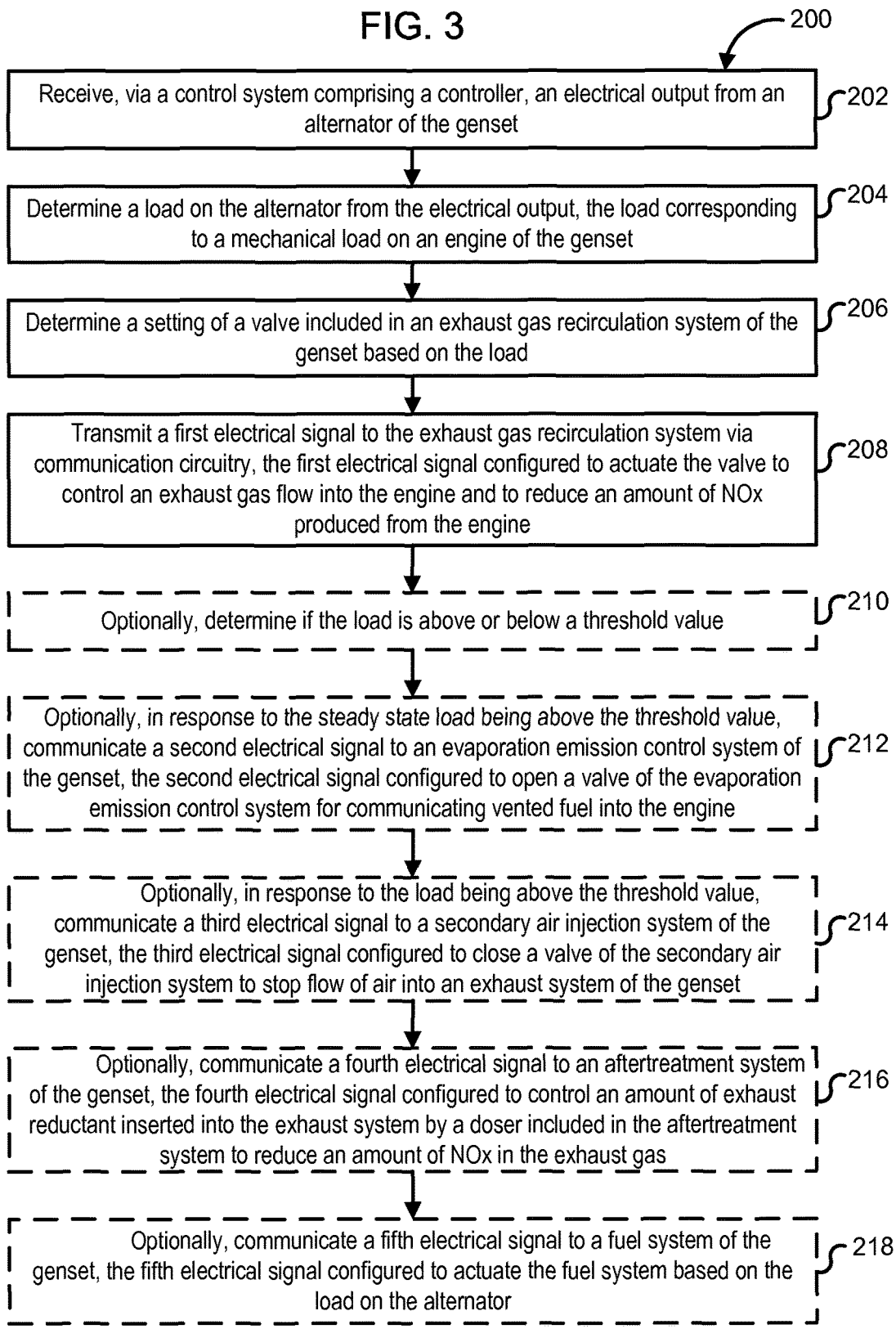

GENSET ENGINE USING ELECTRICAL SENSING TO CONTROL COMPONENTS FOR OPTIMIZED PERFORMANCE

TECHNICAL FIELD

The present disclosure relates generally to monitoring and control of generator sets (gensets).

BACKGROUND

Gensets are used extensively for power generation in locomotives, trucks, recreational vehicles, marine vessels as well as for grid power generation. Gensets normally include a prime mover such as an internal combustion (IC) engine that converts fuel into mechanical energy to rotate a generator (e.g., an alternator). The generator converts the mechanical energy into useable electrical energy at a line voltage and frequency most suitable for transmission and utilization.

Conventional gensets can also include exhaust systems to reduce an exhaust gas (e.g., diesel exhaust gas) produced by the IC engine included in the genset and reduce harmful pollutants including but not limited to NOx gases (nitric oxide and nitrogen dioxide), carbon monoxide (CO), hydrocarbons (HC), and particulate matter (PM) in the exhaust gas. Conventional gensets can also include auxiliary systems, for example, an engine control management (ECM) system, a fuel system with one or more injectors, fuel mixers, and/or carburetors, an ignition system, an air handling (AH) system, an intake system, an evaporation emission control (EVAP) system, an exhaust gas recirculation (EGR) control system, a secondary air injection (SAI) control system, an aftertreatment (AT) system which can include a doser (e.g., an injector or a pump) for inserting an exhaust reductant into the exhaust system, and/or a thermal management (TM) system used to control the temperatures of the exhaust and/or aftertreatment system.

Performance of the engine and the genset is often measured by monitoring the mechanical or electrical load on the engine and/or genset. The performance of the exhaust system is directly correlated to the performance of the engine. Changes in the performance of the engine such as, rapid transition from low load to high load conditions or fluctuations in steady state conditions, can affect the composition or otherwise of the exhaust gas emitted by the engine, for example, concentration of NOx in exhaust gas, exhaust gas temperature, flow rate, etc. This can negatively impact the performance of the exhaust system reducing its efficiency. Stringent emission requirements necessitate strict control over the exhaust gases and as such spikes in NOx concentration observed in exhaust gases due to variation in engine performance are highly undesirable.

SUMMARY

Embodiments described herein relate generally to monitoring and control of gensets, and in particular to monitoring performance of a genset using a signal generated by an alternator of a genset, and controlling various components of the genset to control engine performance and reduce emissions.

In some embodiments, a genset comprises an engine; an alternator, and an exhaust system structured to reduce the exhaust gas. The genset further comprises a controller which is configured to: (a) interpret an electrical output from the alternator via a communication circuitry, (b) determine a load on the alternator from the electrical output which corresponds to a mechanical load on the engine, and (c) generate an engine control response in response to the determined load, the engine control response configured to control operation of at least one of an EVAP system, an EGR system, an SAI system and an aftertreatment system via the communication circuitry.

In other embodiments, a control module for controlling a genset comprises a controller. The genset comprises an engine, an alternator and an exhaust system. The genset also comprises an EVAP system, an EGR system, a SAI, a fuel system, an ignition system, an air handling system, a thermal management system and an aftertreatment system. The controller is configured to: (a) interpret an electrical output from the alternator via a communication circuitry, (b) determine a load on the alternator from the electrical output, the load corresponding to a mechanical load on the engine, and (c) generate an engine control response configured to control operation of at least one of the EVAP system, the EGR system, the SAI system, the fuel system, the ignition system, the air handling system, the thermal management system and the aftertreatment system via the communication circuitry.

In still other embodiments, a method of controlling the performance of a genset comprises receiving, via a control system comprising a controller, an electrical output from an alternator of the genset. A load on the alternator is determined from the electrical output which corresponds to a mechanical load on an engine of the genset. A setting of a valve included in an EGR system of the genset is determined based on the load. A first electrical signal is transmitted to the exhaust gas recirculation system via communication circuitry. The first electrical signal is configured to actuate the valve to control an exhaust gas flow into the engine and to reduce an amount of NOx produced from the engine.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

FIG. 3 is a schematic flow diagram of a method for controlling the performance of a genset, according to another embodiment.

Figure 1:
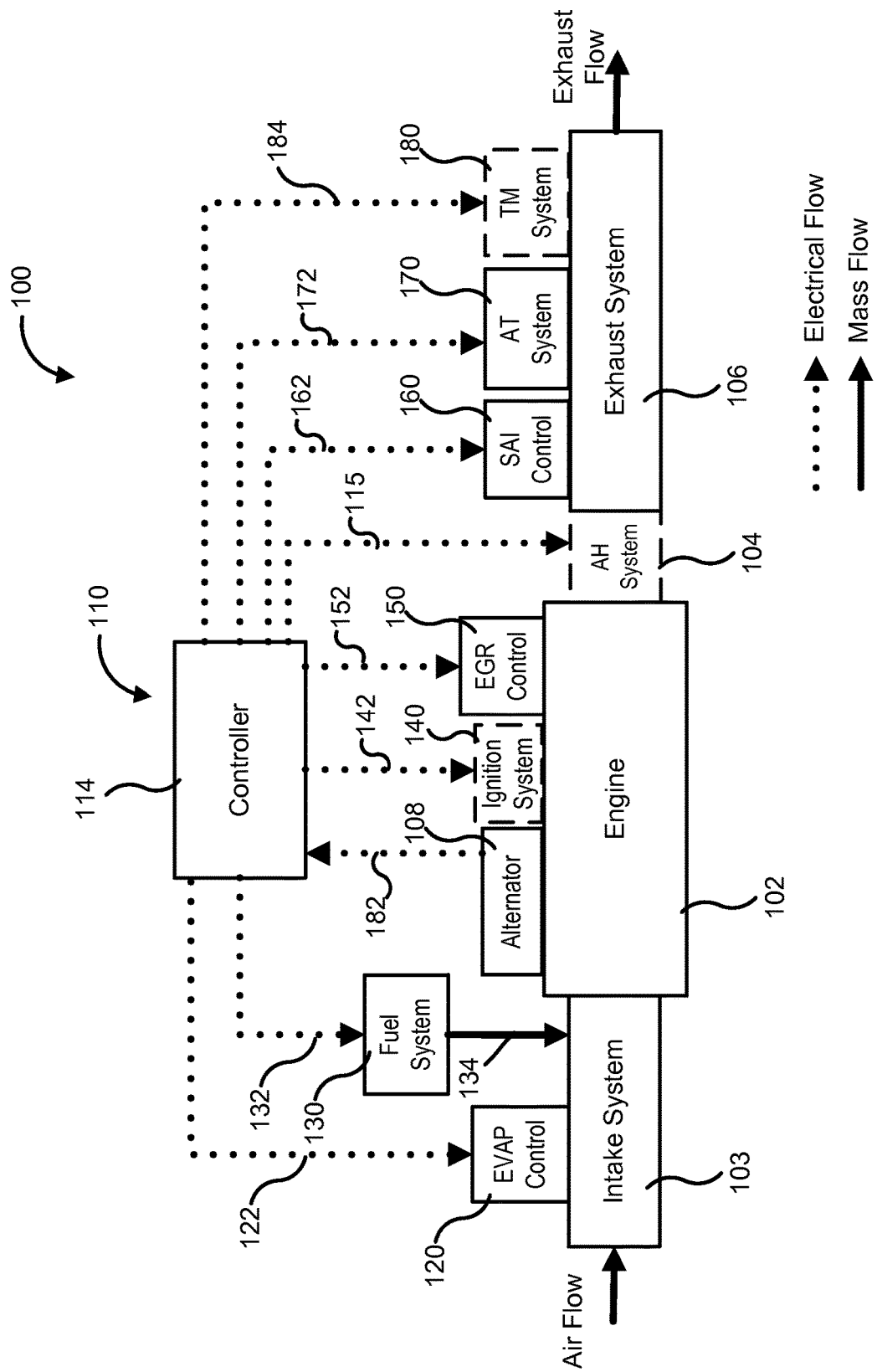
FIG. 1 is a schematic block diagram of a genset that includes a controller for interpreting an electrical output from an alternator of the genset and controlling the performance of various components of the genset, according to an embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION OF VARIOUS EMBODIMENTS

Embodiments described herein relate generally to monitoring and control of gensets, and in particular to monitoring performance of a genset using a signal generated by an alternator of a genset, and controlling various components of the genset to control engine performance and reduce emissions.

Embodiments described herein provide several benefits including, for example: (1) providing near instantaneous sensing of change in performance of an engine by reading and interpreting an electrical output generated by an alternator of the genset corresponding to the load on the engine; (2) determining various operational parameters that affect performance of genset from the same signal (e.g., fuel flow into the engine, flow of vented fuel to engine, flow of air into exhaust system, amount of reductant required, air fuel ratio, etc.); (3) controlling various components of the genset (e.g., EVAP system, EGR system, SAI system, aftertreatment system which includes or does not include a doser, fuel system, an AH system, a TM system, etc.) to maintain or improve performance of the genset; and (4) by reducing pollutants (e.g., NOx gases, CO, HC and PM) from the genset.

FIG. 1 is a schematic block diagram of a genset 100. The genset 100 includes an engine 102, an alternator 108, an exhaust system 106, and a controller 114. The genset 100 also includes at least one of an intake system 103, an EVAP system 120, a fuel injector 130, an EGR system 150, an SAI system 160, and an aftertreatment 170, each of which are optional such that the genset 100 can include any combination of one or more of these components in various embodiments. The genset 100 can, optionally, also include an ignition system 140 and/or a turbocharger 104.

The genset 100 may be a back-up power source in the event of a loss of electrical grid power. In one embodiment, the genset 100 may be provided in recreational vehicles to subsidize grid electricity or as the primary power source when grid electricity is not being used or when grid electricity fails. In other embodiments, the genset 100 may be provided as a secondary source of power for homes or businesses. In yet another embodiment, the genset 100 may be the primary source of power where grid power is not readily available, such as remote locations or construction sites. The genset 100 can also be used as a primary power source for marine vessels, railway engines, construction equipment, or any other application where mechanical and/or electrical power is desired.

The engine 102 can include an IC engine (e.g., a diesel engine) which converts fuel (e.g., diesel, gasoline, ethanol, etc.) into mechanical energy. Combustion of fuel by the engine 102 produces an exhaust gas (e.g., a diesel exhaust gas) that can include NOx gases, carbon monoxide, and/or other harmful pollutants which should be reduced or otherwise treated before expelling into the environment.

The alternator 108 can include a wound rotor or permanent magnet alternator configured to convert a rotational mechanical power produced by the engine 102 into electrical energy. In some embodiments, the alternator 108 can be mechanically coupled to the engine 102 by a mechanical linkage that can provide a desired turn ratio, a torque converter, a transmission, any other form of rotary linking mechanism, or a combination thereof. In some embodiments, an inverter can also be electrically coupled to the alternator.

The alternator 108 is configured to produce an electrical output. The electrical output can include a voltage and/or a current, and is representative of a load on the engine 102. For example, the electrical output can correspond to the engine 102 power (e.g., power=voltage×current). Changes in the load on the alternator 108, for example due to a change in electrical power draw on the alternator 108 by one or more accessories electrically coupled to the alternator 108, affect the electrical output of the alternator 108. This translates to a change in load on the engine 102 which has to catch up to meet the new alternator 108 load requirements. The electrical output can therefore be correlated to the load on the engine 102, as described herein. In particular embodiments, the electrical output from the alternator 108 can be converted to the inverted to transform the electrical output from a direct current (DC) to an alternating current (AC).

The exhaust system 106 is structured to receive an exhaust gas (e.g., diesel exhaust gas) from the engine 102 and reduce or otherwise treat the exhaust gas. The exhaust system 106 may include one or more catalysts formulated to reduce the pollutants included in the exhaust gas. The aftertreatment system 170 is in connection with the exhaust system 106. In some embodiments, the aftertreatment system 170 can include a doser (e.g., an injector) structured to insert a reductant into the exhaust gas within the exhaust system 106 or upstream of the exhaust system 106 to facilitate reduction of the exhaust pollutants and/or to thermally manage the system. In particular embodiments, the exhaust reductant can include a diesel exhaust fluid (DEF), for example urea, an aqueous solution of urea or a commercially available DEF (e.g., the DEF provided under the trade name ADBLUE®).

The SAI system 160 is also in connection with the exhaust system 106. The SAI system 160 can be structured to direct a flow of air into the exhaust system 106. In one embodiment, the SAI system 160 can include a valve structured to control a flow rate or a volume of air directed into the exhaust system 106. Secondary air directed into the exhaust system 106 can allow for more complete combustion of the exhaust gas.

The intake system 103 is located upstream of the engine 102 and is in connection with the engine 102. The intake system 103 is structured to receive air, as well as fuel from the fuel system 130 (e.g., from a fuel injector included in the fuel system 130) and communicate atomized fuel-air mixture to the engine 102. The flow rate of air in the intake system 103 and/or the amount of fuel provided by the fuel injector 130 can determine the air-fuel ratio (AFR) provided to the engine 102.

The EVAP system 120 is also in connection with the intake system 120 and a fuel tank. The EVAP system 120 is structured to direct a flow of vented gas from a fuel tank of the genset 100 or from another fuel tank or fuel storage vessel into the intake system 103. In this manner, the EVAP system 120 reduces the amount of fuel or hydrocarbons evaporating from the fuel tank from being vented into the environment by directing the vented gaseous fuel into the intake system 103. Thus, the vented fuel can be directed to the engine 102 and combusted.

As described herein, the fuel system 130 is structured to insert fuel into the intake system 103 for delivery to the engine 102. In one embodiment, the fuel system 130 can include a fuel injector configured to insert fuel into the engine 102. In other embodiments, the fuel system 130 can include a carburetor. In still other embodiments, the fuel system 130 can include fuel mixers, valves, nozzles, any other components or combinations thereof to facilitate inserting of the fuel in the engine 102. The fuel injector included in the fuel system 130 can include an electromechanical valve that provides metering of the fuel into the engine 102. The fuel injector is normally closed and opens to insert pressurized fuel for a specified length of time into the intake system 103 or the engine 102. The fuel injector atomizes the fuel by forcibly pumping the fuel through a small nozzle under pressure. In one embodiment, the atomized fuel is mixed with intake air in the intake system 103. In another embodiment, the atomized fuel is mixed with the intake air in the combustion area of the engine 102.

The EGR system 150 is in connection with the engine 102 and is structured to direct a flow of exhaust gas into the intake air and engine 102. The exhaust gas provided into combustion chambers of the engine 102 acts as an absorbent of combustion energy to reduce combustion temperatures. Since NOx is primarily produced when a mixture of nitrogen and oxygen is subjected to a high temperature, the lower temperature of combustion because of the EGR system 150 can reduce the amount of NOx generated by the engine 102 during combustion.

In some embodiments, the genset 100 can also include an ignition system 140. The ignition system 140 can be configured to control the ignition of the air fuel mixture included in the engine 102 based on a spark timing map.

In some embodiments, the genset 100 can also include an air handling system 104. In particular embodiments, the air handling system 104 can include a turbocharger. The air handling system 104 can be located downstream of the engine 104 and upstream of the exhaust system 106. The turbocharger included in the air handling system 104 can include a turbine structured to extract energy from the exhaust gas flowing through the air handling system 104 to operate an associated compressor.

In still other embodiments, the genset 100 can also include a thermal management system 180. In particular embodiments, the thermal management system 180 can include heating coils positioned around the aftertreatment system 170 configured to heat the aftertreatment system 170, for example to maintain the aftertreatment system 170 at a predetermined temperature (e.g., to optimize aftertreatment system 170 performance). The thermal management system 180 can also be associated with the fuel system 130, for example to control a quantity of fuel inserted into the engine 102 to maintain a predetermined temperature for optimized aftertreatment system 170 performance.

Other components which can be included in the genset 100 and are not shown in FIG. 1 include a fuel pump, a fuel pressure regulator, other various input sensors such as, for example, rotational speed sensor, a throttle position sensor, a crank position sensor, a cam position sensor, a coolant sensor, an oil temperature sensor, manifold air temperature and pressure sensors, exhaust gas temperature sensors, NOx sensors, knock sensors, oxygen sensors, particulate matter sensor, fuel quality/characteristic sensor, humidity sensor, any other components, or a combination thereof.

The controller 114 is configured to control at least a portion of the genset 100. The controller 114 is in electrical communication with one or more of the alternator 108, the EVAP system 120, the EGR system 150, the SAI system 160, the fuel system 130, the ignition system 140, air handling system 104, thermal management system 180, and the aftertreatment system 170 via communication circuitry (e.g., electrical leads, wires, cables or wireless communication circuitry). For example, as shown in FIG. 1, the controller 114 is in electrical communication with the alternator via a first communication circuitry 182, with the EVAP system 120 via a second communication circuitry 122, with the EGR system via a third communication circuitry 152, with the SAI system via a fourth communication circuitry 162, and with the aftertreatment system via a fifth communication circuitry 172. Furthermore, the controller 114 can also be in electrical communication with the fuel system 130 via a sixth communication circuitry 132, with the ignition system 140 via a seventh communication circuitry 142, with the air handling system 104 via an eighth communication circuitry 115, and with the thermal management system 180 via a ninth communication circuitry 184. While FIG. 1 illustrates each component in communication with controller 114 via separate communication circuitry, it should be understood that, in some embodiments, one type of communication circuitry may be used to communicate with multiple components (e.g., a single wireless communication interface may be used to communicate wirelessly with multiple components).

The controller 114 can include a processor (e.g., a microcontroller) and one or more sensors, for example an electrical sensor for sensing a voltage or a current generated by the alternator 108 as described herein. In some embodiments, the controller 114 can be included in a control module which is in electrical communication with one or more of the components of the genset 100 described herein and operable to perform the sensing and control functions described herein. In particular embodiments, the controller 114 can be a system computer of the genset 100. In some embodiments, the controller 114 and the communication circuitry form an open loop control system. In other embodiment, the controller 114 and the communication circuitry can form a closed loop control system.

Figure 2:
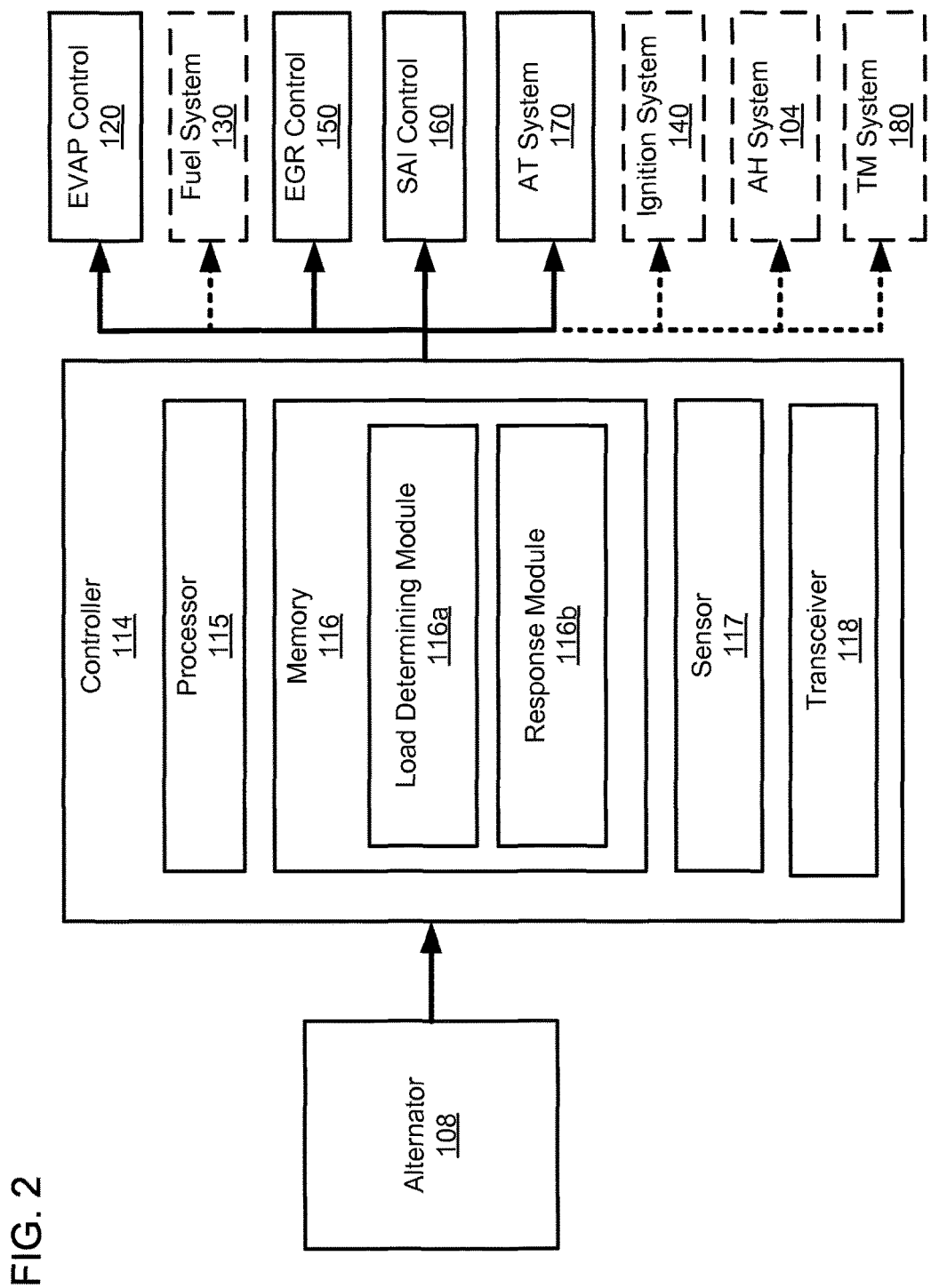
FIG. 2 is a schematic block diagram of a controller included in the genset of FIG. 1.

For example, FIG. 2 is a schematic block diagram of the controller 114 showing various components can be included in the controller 114. The controller 114 includes a processor 115, a memory 116 or other computer readable medium, a sensor 117 and a transceiver 118. It should be understood that the controller 114 shows only one embodiment of the controller 114 and any other controller capable of performing the operations described herein can be used.

The sensor 117 can include an electrical sensor configured to receive and interpret an electrical output from the alternator 108 via communication circuitry or other wireless communication. In some embodiments, the sensor 117 can sense a current and/or a voltage generated by the alternator 108.

The processor 115 can include a microprocessor, programmable logic controller (PLC) chip, an ASIC chip, or any other suitable processor. The processor 115 is in communication with the memory 116 and configured to execute instructions, algorithms, commands or otherwise programs stored in the memory 116.

Memory 116 includes any of the memory and/or storage components discussed herein. For example, memory 116 may include RAM and/or cache of processor 115. Memory 116 may also include one or more storage devices (e.g., hard drives, flash drives, computer readable media, etc.) either local or remote to device controller 114.

The memory 116 is configured to store look up tables, algorithms or instructions. For example, the memory 116 includes a load determining module 116a configured to store instructions for determining a load on the alternator 108 (or engine 102) when executed by the processor 115, based on the electrical output received by the sensor.

The memory 116 also includes a response module 116b configured to store instructions for determining an engine control response in response to the determined load, when executed by the processor 115. The determined engine control response (e.g., a suitable electrical signal such as an actuating current or voltage) is communicated to at least one of the EVAP system 120, the EGR system 150, the SAI system 160, the aftertreatment system 170 and optionally, the fuel system 130, the ignition system 140, the air handling system 104 and the thermal management system 180 so as to at least partially control their operation.

The transceiver 118 is configured to generate the engine control response and communicate the engine control response to at least one of the systems of the genset described herein via the communication circuitry.

In this manner, the controller 114 is configured to: (a) interpret an electrical output from the alternator 108 via the first communication circuitry 182, (b) determine a load on the alternator 108 from the electrical output which corresponds to a mechanical load on the engine 102, and (c) generate an engine control response configured to control operation of at least one of the EVAP system 120, the EGR system 150, the SAI system 160 and the aftertreatment system 170 via the communication circuitry.

Expanding further, the electrical output generated by the alternator 108 can include a voltage and/or a current. In one embodiments, the controller 114 (e.g., the load determining module 116a) can use the current and/or voltage information to determine a genset 100 power which is equal to the voltage multiplied by current. In another embodiment, in which an alternator efficiency is known, the controller 114 can also be configured to calculate an engine power which is equal to genset power divided by alternator efficiency. Each of these, for example, the voltage, current, genset power and/or engine power can be used to determine a load on the alternator 108 or as input for determining a control parameter (e.g., determined by the response module 116b) of any one of the components of the genset 100.

The electrical output is representative of the load on the engine 102. Expanding further, a change in electrical draw on the alternator 108 by one or more accessories electrically coupled to the alternator 108 changes the load (i.e., electrical load) on the alternator 108. The change in electrical load on the alternator 108 is compensated by the engine 102 which thereby also experiences a change in load. In other words, the load on the alternator 108 corresponds to the load on the engine 102. Thus, the electrical output corresponds to the performance of the engine 102.

The performance of a genset as characterized by voltage and frequency stability during operation is based on the response of the engine to load. Conventionally, the engine uses mechanical sensing to determine the control of one or more components to optimize its performance and control pollutants. Mechanical sensing is a relatively slow process and control operation based on mechanical sensing is slow. For example, when the load increases on the alternator 108, the engine 102 loses speed and works to catch up to meet the load requirement. There is some delay between when the change in load on the alternator 102 occurs and the time during which the operation of one or more components of the genset 100 is adjusted to account for the load, when using mechanical sensing. This delay can lead to lower performance of the genset 100 during a time period of the delay which may cause poor transient emissions performance.

In contrast, the controller 114 uses an electrical output of the alternator 108 to determine the load on the engine 102 which is substantially faster than sensing the mechanical load on the engine 102. In some embodiments, by using electrical sensing, the controller 114 can nearly instantaneously sense the change in load on the engine 102. As used herein, the term "near instantaneous" means less than a second, or the order of an engine revolution which is about 17 milliseconds for an engine operating at 3,600 rpm. In some embodiments, the controller 114 communicates an electrical signal to the one or more components of the genset 100 to control their operation and thereby the operation of the genset 100, which is also a near instantaneous process. In such embodiments, the controller 114 can account for any changes in load and thereby, the performance of the engine 102 or otherwise the genset 100 near instantaneously with little or no deterioration in the performance of the engine 102.

In some embodiments, the electrical output from the alternator 108 can be conditioned, for example filtered to remove any noise before being communicated to the controller 114. For example, the genset 100 can include conditioning hardware (not shown) such as a rectifier and/or an inverter. In particular embodiments, the condition hardware and/or software can be integrated into the controller 114 to condition, filter or otherwise process the electrical output from the alternator 108.

In one embodiment, the EGR system 150 can include a valve structured to control a flow of exhaust gas into the engine 102 and the load on the alternator 108 corresponds to a fuel flow into the engine 102. In such embodiments, the controller 114 (e.g., the response module 116b of the controller 114) can be configured to determine a setting of the valve included in the EGR system 150 based on the fuel flow, engine speed, engine load, or other parameters. The controller 114 communicates the engine control response (e.g., a first electrical signal produced by the transceiver 118) to the EGR system 150 via the third communication circuitry 152 to actuate the valve. The actuation can include an opening or closing of the valve and configured to control an exhaust gas flow into the engine 102 to reduce the amount of NOx produced by the engine 102.

Control of the genset 100 performance via control of the EGR system 150 can be particularly beneficial for reducing NOx emissions from the engine 102 during transient operation. When a transient load is applied to the genset 100, the load is imparted on the alternator 108 before the load is imparted on the engine 102. The load increase (or decrease) on the engine's 102 crankshaft will eventually require addition of more or less fuel for combustion to produce more or less engine 102 power, which can increase the NOx emissions.

When more power is requested from the alternator 108 to the engine 102, the controller 114 can sense the increased load on the alternator 108 via the electrical output. In one exemplary embodiment, the controller 114 can use this information to look up what the EGR system 150 valve setting should be in a lookup table for the new load requirement which can be stored on the load determining module 116a included in the memory 116. The controller 114 can then communicate the electrical signal to the EGR system 150 to actuate the EGR valve to the value determined through the lookup table. In some embodiments, the controller 114 can determine the new load requirement and/or new EGR value using an algorithm/set of one or more formulas and/or data structure other than a lookup table.

In this way, the controller 114 can allow more or less EGR to the engine 102 so that the higher or lower EGR flow aligns with the higher or lower fuel flows requested during transient operation. This reduces the amount of NOx produced from the engine 102 by reducing the lag time between the fuel flow change and the lagging EGR flow. This lag time may be substantially less than a conventional mechanical sensing system in which it can be several combustion cycles before the appropriate EGR flow rate aligns with the fuel flow rate thereby, resulting in a NOx spike until the EGR flow rate is at the appropriate level.

In another embodiment, the EVAP system 120 can include a valve structured to control a flow of vented fuel from the fuel tank to the engine 102. Furthermore, the load on the alternator 108 can correspond to a steady state load. In such embodiments, the controller 114 can be configured to determine the steady state load (e.g., whether the steady state load is above or below a threshold value). In response to the load (e.g., the load being above a threshold value), the controller 114 communicates the engine control response (e.g., a second electrical signal produced by the transceiver 118) to the EVAP system 120 via the second communication circuitry 122. In such embodiments, the engine control response is configured to open the valve (either partially or fully) of the EVAP system 120 for communicating the vented fuel into the engine 102.

As described before herein, the EVAP system 120 is structured to prevent or reduce venting of the gaseous fuel or otherwise fuel vapors to the environment by venting the fuel to the engine 102 and combusting the vented fuel in the engine 102. The EVAP system 120 is structured to direct a flow of vented gaseous fuel from the fuel tank to the intake system 103, which is then directed into the engine 102 and is combusted. The vented fuel rate can be relatively high such that the engine 102 performs poorly if too much fuel vapor is vented from the fuel tank to the engine 102 (i.e., the air-to-fuel ratio is too rich for proper engine performance).

The amount of vented fuel flow that the engine 102 can tolerate is a function of the engine 102 load. At low loads, the engine 102 can tolerate relatively low vented fuel flow and at high loads, the engine 102 can tolerate relatively high vented fuel flow. To ensure that the appropriate amount of vented fuel flow is being vented into the intake system 103, the controller 114 can be configured to measure the steady-state load from the alternator 108 (e.g. via the sensor 117). The measured steady state load is input into an algorithm or lookup table stored in the controller 114 (e.g., in load determining module 116a of the memory 116) to determine the appropriate amount of vented fuel flow entering the intake system 103.

In one embodiment, the measured steady state load is compared to a threshold value stored in the controller 114 below which, no vented fuel flow should the intake system 103. If the vented fuel flow is above a threshold value, the controller 114 determines a response (e.g., using instructions stored in the response module 116b) and communicates the engine control response corresponding to the response to the EVAP system 120 via the second communication circuitry 122 to open the valve and allow vented fuel flow into the intake system 103. If the steady state signal is below the threshold value, the valve of the EVAP system 120 is held closed to prevent the vented fuel flow into the intake system 103 and thereby, the engine 102. In this way, an appropriate air-to-fuel ratio for proper engine 102 performance is maintained.

In yet another embodiment, the SAI system 160 includes a valve structured to control a flow of air into the exhaust system 106. Furthermore, the load on the alternator 108 corresponds to the flow of air into the exhaust system 106. In such embodiments, the controller 114 can be configured to determine the load (e.g., if the load is above or below a threshold value) and communicate the engine control response (e.g., a third electrical signal) to the SAI system 160 via the fourth communication circuitry 162. The engine control response is configured to control the SAI system 160 in response to the load (e.g., the load being above a threshold value) which controls the flow of air into the exhaust system 106.

Expanding further, the function of the secondary air flow is to provide oxygen to the catalyst which, in combination with the exhaust pollutants from the engine 102, allows the catalyst to convert the pollutants to non-pollutants. This chemical conversion can be exothermic, such that the temperature of the catalyst increases. The secondary air flow into the exhaust system 106 impacts catalyst temperatures and therefore catalyst performance, reliability, and safety. As described herein, the controller 114 can be configured to sense the load on the alternator 108, compare this measured load to a threshold value stored in the controller 114 (e.g., in the load determining module 116a of the memory 116) above which, no secondary air should be injected into the exhaust system 106. If the measured load is above the threshold value, the controller 114 communicates the electrical signal to the SAI system 160 to close its valve when loads are high, which is when the catalyst temperatures are high. In this manner, catalyst deterioration at the high temperature can be prevented or reduced.

In still another embodiment, the controller 114 can be configured to communicate the engine control response (e.g., a fourth electrical signal) to the aftertreatment system 170 via the fifth communication circuitry 172. In one embodiment, the aftertreatment system 170 can include a doser, for example an injector configured to insert exhaust reductant into the exhaust system 106. In such embodiments, the engine control response can be configured to control an amount of the exhaust reductant inserted into the exhaust system 106 by the doser included the aftertreatment system 170 to reduce an amount of NOx or other pollutants in the exhaust gas (e.g., a diesel exhaust gas).

For example, the exhaust system 106 can include a selective catalytic reduction (SCR) system which includes catalysts for reducing NOx emission. The alternator 108 load is sensed by the controller 114 and can be compared to a lookup table or a correlation table (e.g., stored in the load determining module 116a) to determine the optimum amount of exhaust reductant for inserting into the exhaust system 106. Higher engine 102 loads are directly related to higher NOx flows in the exhaust gas, which require higher exhaust reductant flow to reduce the NOx flows to appropriate levels.

In further embodiments, the controller 114 can also be configured to communicate the engine control response (e.g., a fifth electrical signal) to the fuel system 132 via the sixth communication circuitry 132. In one embodiment, the fuel system 130 can include a fuel injector. In such embodiments, the engine control response can be configured to actuate the fuel injector included in the fuel system 130 based on the load on the alternator 108, as described before herein.

In another embodiment, in which the genset 100 includes the ignition system 140, the controller 114 can also be configured to receive a signal from a crank position sensor (not shown). The crank position sensor can include an electrical sensor which can determine the position of a crank shaft and the rotational speed of the engine 102. In such embodiments, the controller 114 can also be configured to communicate an engine control response to the ignition system 140 via the seventh communication circuitry 142 to effectuate a spark timing. For example, the controller 114 can include a lookup table that determines spark event timing and uses the information from the crank position sensor to start the ignition event prior to degradation of engine 102 performance.

In still another embodiment, in which the genset 100 includes an air handling system 104, the controller 114 may be in electrical communication with the air handling system 104 via the eighth communication circuitry 115. In one embodiment, the air handling system 104 can include a turbine (e.g., a turbine of a turbocharger). In such embodiments, the controller 114 can also be configured to communicate the engine control response to the air handling system 104 via the eighth communication circuitry 115 to control an operation of the turbine.

In yet another embodiment, in which the genset 100 includes a thermal management system 180, the controller 114 may be in electrical communication with the thermal management system 180 via the ninth communication circuitry 184. As described herein, the thermal management system 180 can include heating coils for heating the aftertreatment system 170. In such embodiments, the controller 114 can also be configured to communicate the engine control response to the thermal management system 180 via the ninth communication circuitry 184 to control an operation of the thermal management system 180. For example, the electrical output can be configured to command the thermal management system 180 to heat the aftertreatment system 170 and/or the exhaust system 106 to a predetermined temperature to optimize removal of pollutants (e.g., NOx) from the exhaust gas based on the load.

In this manner, the controller 114 can be configured to electrically sense the load on the alternator 108 and control the performance of the engine 102 and the exhaust system 106 by controlling the operation of one or more of the components of the genset 100. In some embodiments, sensing and control can be near instantaneous which can prevent unwanted pollutant (e.g., NOx) spikes from the exhaust system 106 due to changing loads on the engine 102.

FIG. 3 shows a block diagram of an exemplary method 200 for monitoring and controlling the performance of a genset. The method 200 can be used with any genset, for example, the genset 100 or any other type of genset.

The method 200 includes receiving, via a control system including a controller, an electrical output from an alternator of the genset, at 202. For example, the controller can include the controller 114 included in the genset 100, or any other controller described herein. The controller can be in electrical communication with the alternator (e.g., the alternator 108 included in the genset 100) via communication circuitry.

The electrical output from the alternator can correspond to a load on the alternator. The load on the alternator is determined from the electrical output of the genset, at 204. The load corresponds to a mechanical load on an engine included in the genset. For example, the alternator can experience a change in load due to a change in electrical draw on the alternator (e.g., the alternator 108) by one or more accessories electrically coupled to the alternator. This change on the alternator load is followed by the change in load of the engine (e.g., the engine 102). Thus the change on the alternator is a faster indicator of the change in load on the engine and corresponds to the change in load on the engine. The electrical output from the alternator, which can include a voltage and/or a current, is directly dependent on the load on the alternator and thus can be used to determine the load on the engine.

A setting of a valve included in an EGR system of the genset is determined based on the load, at 206. The EGR system can include the EGR system 150 or any other EGR system described herein. The EGR system is configured to communicate an exhaust gas into the engine as described before herein.

A first electrical signal is transmitted to the exhaust gas recirculation system via communication circuitry, at 208. The first electrical signal is configured to actuate the valve to control an exhaust gas flow into the engine and to reduce an amount of NOx produced from the engine. Controlling the amount of exhaust gas flowing into the engine during transient operation can allow controlling of a temperature of the combustion chamber of the engine to reduce pollutant emissions, as described before herein with respect to the genset 100.

In one embodiment, the method 200 can optionally include determining if the load is above or below a threshold value, at 210. In response to the load being above the threshold value, a second electrical signal can optionally be communicated to an EVAP system of the genset (e.g., the EVAP system 120 included in the genset 100), at 212, which is configured to open a valve of the EVAP system for communicating a vented fuel into the engine.

In particular embodiments, the load can include a steady state load. The vented fuel which includes fuel vapors can be communicated from a fuel tank of the genset to the engine via an intake system (e.g., the intake system 103). If the vented fuel rate is too high, the engine performs poorly if too much fuel vapor is vented from the fuel tank to the engine. Thus control of the flow of the vented fuel into the engine by the controller can prevent degradation in engine performance as well as reduce pollutant (e.g. NOx) emissions.

In another embodiments, the method 200 can optionally include determining if the load is above or below a threshold value, and in response to the load being above a threshold value, communicate a third electrical signal to a SAI system of the genset, at 214. The third electrical signal is configured to close a valve of the SAI system (e.g., the SAI system 160 included in the genset 100) thereby stopping flow of air into an exhaust system of the genset. Controlling the flow of air into the genset allows controlling the temperature of the catalyst included in the exhaust system of the genset to reduce NOx emissions as described with respect to the genset 100.

In yet another embodiment, the method 200 can also include communicating a fourth electrical signal to an aftertreatment system with a doser of the genset, at 216. The fourth electrical signal is configured to control an amount of exhaust reductant inserted into the exhaust system of the genset by the doser to reduce an amount of NOx in the exhaust gas. A change in load on the engine increases or decreases the amount of fuel combusted by the engine and thereby impacts the amount of pollutants (e.g., NOx) emitted in the exhaust gas. By controlling the amount of exhaust reductant inserted into the exhaust system, the amount of exhaust reductant can be optimized according to the quantity of pollutants emitted based on the load on the alternator as described with respect to the genset 100.

In still another embodiment, the method 200 can also include communicating a fifth electrical signal to a fuel system of the genset, at 218. The fifth electrical signal is configured to actuate the fuel system (e.g., a fuel injector included in the fuel system) based on the load on the alternator. Thus the amount of fuel injected into the controller can be adjusted based on the load on the engine as described with respect to the genset 100.

While 210-218 are described above as separate optional embodiments, it should be understood that two or more of 210-218 may be performed in combination with one another in various exemplary embodiments.

As used herein, the singular forms "a", "an" and "the" include plural referents unless the context clearly dictates otherwise. Thus, for example, the term "a member" is intended to mean a single member or a combination of members, "a material" is intended to mean one or more materials, or a combination thereof.

As used herein, the terms "about" and "approximately" generally mean plus or minus 10% of the stated value. For example, about 0.5 would include 0.45 and 0.55, about 10 would include 9 to 11, about 1000 would include 900 to 1100.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes and omissions may also be made in the design, operating conditions and arrangement of the various exemplary embodiments without departing from the scope of the present invention.

What is claimed is:

1. A genset, comprising:
an engine;
an alternator;
an exhaust system structured to reduce the exhaust gas; and
a controller configured to:
(a) interpret an electrical output from the alternator via a communication circuitry,
(b) determine a load on the alternator from the electrical output, the load corresponding to a mechanical load on the engine,
(c) generate an engine control response in response to the load on the alternator determined from the electrical output of the alternator, the engine control response configured to control operation of at least one of an evaporation emission control system, an exhaust gas recirculation control system, a secondary air injection control system, or an aftertreatment system via the communication circuitry.

2. The genset of claim 1, wherein the genset further comprises:
the evaporation emission control system;
the exhaust gas recirculation control system;
the secondary air injection control system; and
the aftertreatment system.

3. The genset of claim 1, wherein the electrical output is received from the alternator before interpreting by the controller.

4. The genset of claim 2, wherein the exhaust gas recirculation control system includes a valve structured to control a flow of exhaust gas into the engine, the load on the alternator corresponds to a fuel flow into the engine, and wherein the controller is configured to:
determine a setting of the valve included in the exhaust gas recirculation control system based on the fuel flow, and
communicate the engine control response to the exhaust gas recirculation system control via the communication circuitry to actuate the valve, the actuation configured to control an exhaust gas flow into the engine to reduce an amount of NOx produced from the engine.

5. The genset of claim 2, wherein the evaporation emission control system includes a valve structured to control a flow of vented fuel from a fuel tank to the engine, the load on the alternator corresponding to a steady state load, and wherein the controller is configured to:
determine if the steady state load is above or below a threshold value, and
in response to the steady state load being above the threshold value, communicate the engine control response to the evaporation emission control system via the communication circuitry, the engine control response configured to open the valve of the evaporation emission control system for communicating the vented fuel into the engine.

6. The genset of claim 2, wherein the secondary air injection control system includes a valve structured to control a flow of air in to the exhaust system, the load on the alternator further corresponding to the flow of air into the exhaust system, and wherein the controller is configured to:
determine if the load is above or below a threshold value, and
communicate the engine control response to the secondary air injection control system via the communication circuitry, the engine control response configured to close the valve in response to the load being above the threshold value, the closing stopping the flow of air into the exhaust system.

7. The genset of claim 2, wherein the controller is configured to:
communicate the engine control response to the aftertreatment system, the engine control response configured to control an amount of exhaust reductant inserted into the exhaust system by the aftertreatment system to reduce an amount of NOx in the exhaust gas.

8. The genset of claim 1, further comprising:
a fuel system,
wherein the controller is in electrical communication with the fuel system via the communication circuitry, and wherein the controller is further configured to communicate the engine control response to the fuel system, the engine control response configured to actuate the fuel system based on the load on the alternator.

9. The genset of claim 1, wherein the controller and the communication circuitry form an open loop control system.

10. The genset of claim 1, wherein the controller and the communication circuitry form a closed loop control system.

11. The genset of claim 1, further comprising:
an air handling system,
wherein the controller is in electrical communication with the air handling system via the communication circuitry, and wherein the controller is further configured to communicate the engine control response to the air handling system to control an operation of the air handling system based on the load.

12. The genset of claim 1, further comprising:
an ignition system,
wherein the controller is in electrical communication with the ignition system via the communication circuitry, and wherein the controller is further configured to communicate the engine control response to the ignition system to control an operation of the ignition system based on the load.

13. The genset of claim 1, further comprising:
a thermal management system,
wherein the controller is in electrical communication with the thermal management system via the communication circuitry, and wherein the controller is further configured to communicate the engine control response to the thermal management system to control an operation of the thermal management system based on the load.

14. A control module for controlling a genset, the genset comprising an engine, an alternator, an exhaust system, an evaporation emission control system, an exhaust gas recirculation control system, a secondary air injection control system, a fuel system, an ignition system, an air handling system, a thermal management system and an aftertreatment system; the control module comprising:
a controller configured to:
(a) interpret an electrical output from the alternator via a communication circuitry,
(b) determine a load on the alternator from the electrical output, the load corresponding to a mechanical load on the engine,
(c) generate an engine control response in response to the load on the alternator determined from the electrical output of the alternator, the engine control response configured to control operation of at least one of the evaporation emission control system, the exhaust gas recirculation control system, the secondary air injection control system, the fuel system, the ignition system, the air handling system, the thermal management system or the aftertreatment system via the communication circuitry.

15. The control module of claim 14, wherein the load on the alternator corresponds to a fuel flow into the engine, the controller configured to:
determine a setting of a valve included in the exhaust gas recirculation control system based on the fuel flow, and
communicate the engine control response to the exhaust gas recirculation control system via the communication circuitry to actuate the valve, the actuation configured to control an exhaust gas flow into the engine to reduce an amount of NOx produced from the engine.

16. The control module of claim 14, wherein the load comprises a steady state load, the controller further configured to:
determine if the steady state load is above or below a threshold value, and
in response to the steady state load being above the threshold value, communicate the engine control response to the evaporation emission control system via the communication circuitry, the engine control response configured to open the valve of the evaporation emission control system for communicating the vented fuel into the engine.

17. The control module of claim 14, wherein the controller is further configured to:
determine if the load is above or below a threshold value, and
in response to the load being above the threshold value, communicate the engine control response to the secondary air injection control system via the communication circuitry, the engine control response configured to close a valve of the secondary air injection control system, the closing stopping a flow of air into the exhaust system.

18. The control module of claim 14, wherein the controller is further configured to:
communicate the engine control response to the aftertreatment system, the engine control response configured to control an amount of exhaust reductant inserted into the exhaust system by the aftertreatment system to reduce an amount of NOx in the exhaust gas.

19. The control module of claim 14, wherein the controller is in electrical communication with the fuel system via the communication circuitry, the controller further configured to:
communicate the engine control response to the fuel system, the engine control response configured to actuate the fuel system based on the load on the alternator.

20. A method of controlling the performance of a genset, comprising:
receiving, via a control system comprising a controller, an electrical output from an alternator of the genset;
determining a load on the alternator from the electrical output, the load corresponding to a mechanical load on an engine of the genset;
determine a setting of a valve included in an exhaust gas recirculation control system of the genset in response to the load on the alternator determined from the electrical output of the alternator, and
transmitting a first electrical signal to the exhaust gas recirculation control system via communication circuitry, the first electrical signal configured to actuate the valve to control an exhaust gas flow into the engine and to reduce an amount of NOx produced from the engine.

21. The method of claim 20, further comprising;
determining if the load is above or below a threshold value, and
in response to the load being above the threshold value, communicating a second electrical signal to an evaporation emission control system of the genset, the second electrical signal configured to open a valve of the evaporation emission control system for communicating the vented fuel into the engine.

22. The method of claim 20, wherein the load comprises a steady state load.

23. The method of claim 20, further comprising;
determining if the load is above or below a threshold value, and
in response to the load being above the threshold value, communicating an electrical signal to a secondary air injection control system of the genset, the electrical signal configured to close a valve of the secondary air injection control system, the closing configured to stop flow of air into an exhaust system of the genset.

24. The method of claim 20, further comprising:
communicating an electrical signal to an aftertreatment system of the genset, the electrical signal configured to control an amount of exhaust reductant inserted into the exhaust system by a doser included in the aftertreatment system to reduce an amount of NOx in the exhaust gas.

25. The method of claim 20, further comprising:
communicating an electrical signal to a fuel system of the genset, the electrical signal configured to actuate the fuel system based on the load on the alternator.

26. A genset, comprising:
an engine;
an alternator;
an exhaust system structured to reduce the exhaust gas;
an evaporation emission control system including a valve structured to control a flow of vented fuel from a fuel tank to the engine;
an exhaust gas recirculation control system;
a secondary air injection control system;
an aftertreatment system; and
a controller configured to:
  (a) interpret an electrical output from the alternator via a communication circuitry,
  (b) determine a load on the alternator from the electrical output, the load corresponding to a mechanical load on the engine and further corresponding to a steady state load,
  (c) generate an engine control response in response to the determined load, the engine control response configured to control operation of at least one of the evaporation emission control system, the exhaust gas recirculation control system, the secondary air injection control system, or the aftertreatment system via the communication circuitry,
  (d) determine if the steady state load is above or below a threshold value, and
  (e) in response to the steady state load being above the threshold value, communicate the engine control response to the evaporation emission control system via the communication circuitry, the engine control response configured to open the valve of the evaporation emission control system for communicating the vented fuel into the engine.

27. A genset, comprising:
an engine;
an alternator;
an exhaust system structured to reduce the exhaust gas;
an evaporation emission control system;
an exhaust gas recirculation control system;
a secondary air injection control system including a valve structured to control a flow of air in to the exhaust system;
an aftertreatment system; and
a controller configured to:
  (a) interpret an electrical output from the alternator via a communication circuitry,
  (b) determine a load on the alternator from the electrical output, the load corresponding to a mechanical load on the engine and further corresponding to the flow of air into the exhaust system,
  (c) generate an engine control response in response to the determined load, the engine control response configured to control operation of at least one of the evaporation emission control system, the exhaust gas recirculation control system, the secondary air injection control system, or the aftertreatment system via the communication circuitry,
  (d) determine if the load is above or below a threshold value, and
  (e) communicate the engine control response to the secondary air injection control system via the communication circuitry, the engine control response configured to close the valve in response to the load being above the threshold value, the closing stopping the flow of air into the exhaust system.

28. A control module for controlling a genset, the genset comprising an engine, an alternator, an exhaust system, an evaporation emission control system, an exhaust gas recirculation control system, a secondary air injection control system, a fuel system, an ignition system, an air handling system, a thermal management system and an aftertreatment system; the control module comprising:
a controller configured to:
  (a) interpret an electrical output from the alternator via a communication circuitry,
  (b) determine a load on the alternator from the electrical output, the load corresponding to a mechanical load on the engine and comprising a steady state load,
  (c) generate an engine control response in response to the determined load, the engine control response configured to control operation of at least one of the evaporation emission control system, the exhaust gas recirculation control system, the secondary air injection control system, the fuel system, the ignition system, the air handling system, the thermal management system or the aftertreatment system via the communication circuitry;
  (d) determine if the steady state load is above or below a threshold value, and
  (e) in response to the steady state load being above the threshold value, communicate the engine control response to the evaporation emission control system via the communication circuitry, the engine control response configured to open the valve of the evaporation emission control system for communicating the vented fuel into the engine.

29. A control module for controlling a genset, the genset comprising an engine, an alternator, an exhaust system, an evaporation emission control system, an exhaust gas recirculation control system, a secondary air injection control system, a fuel system, an ignition system, an air handling system, a thermal management system and an aftertreatment system; the control module comprising:
a controller configured to:
  (a) interpret an electrical output from the alternator via a communication circuitry,
  (b) determine a load on the alternator from the electrical output, the load corresponding to a mechanical load on the engine,
  (c) generate an engine control response in response to the determined load, the engine control response configured to control operation of at least one of the evaporation emission control system, the exhaust gas recirculation control system, the secondary air injection control system, the fuel system, the ignition system, the air handling system, the thermal management system or the aftertreatment system via the communication circuitry (d) determine if the load is above or below a threshold value, and
(e) in response to the load being above the threshold value, communicate the engine control response to the secondary air injection control system via the communication circuitry, the engine control response configured to close a valve of the secondary air injection control system, the closing stopping a flow of air into the exhaust system.

30. A method of controlling the performance of a genset, comprising:

receiving, via a control system comprising a controller, an electrical output from an alternator of the genset;

determining a load on the alternator from the electrical output, the load corresponding to a mechanical load on an engine of the genset;

determining a setting of a valve included in an exhaust gas recirculation control system of the genset based on the load, and transmitting a first electrical signal to the exhaust gas recirculation control system via communication circuitry, the first electrical signal configured to actuate the valve to control an exhaust gas flow into the engine and to reduce an amount of NOx produced from the engine, determining if the load is above or below a threshold value, and in response to the load being above the threshold value, communicating a second electrical signal to an evaporation emission control system of the genset, the second electrical signal configured to open a valve of the evaporation emission control system for communicating the vented fuel into the engine.

31. A method of controlling the performance of a genset, comprising:

receiving, via a control system comprising a controller, an electrical output from an alternator of the genset;

determining a load on the alternator from the electrical output, the load corresponding to a mechanical load on an engine of the genset;

determining a setting of a valve included in an exhaust gas recirculation control system of the genset based on the load, and transmitting a first electrical signal to the exhaust gas recirculation control system via communication circuitry, the first electrical signal configured to actuate the valve to control an exhaust gas flow into the engine and to reduce an amount of NOx produced from the engine, determining if the load is above or below a threshold value, and in response to the load being above the threshold value, communicating a second electrical signal to a secondary air injection control system of the genset, the second electrical signal configured to close a valve of the secondary air injection control system, the closing configured to stop flow of air into an exhaust system of the genset.

* * * * *